US010597059B2

(12) United States Patent
Inaba et al.

(10) Patent No.: US 10,597,059 B2
(45) Date of Patent: Mar. 24, 2020

(54) STEERING WHEEL

(71) Applicant: NIHON PLAST CO., LTD., Fujinomiya-shi, Shizuoka (JP)

(72) Inventors: Yuta Inaba, Shizuoka (JP); Yohei Kiuchi, Shizuoka (JP); Akihiko Yamami, Shizuoka (JP); Takuya Ohki, Shizuoka (JP)

(73) Assignee: NIHON PLAST CO., LTD., Fujinomiya-Shi, Shizuoka (JP)

( * ) Notice: Subject to any disclaimer, the term of this patent is extended or adjusted under 35 U.S.C. 154(b) by 0 days.

(21) Appl. No.: 16/019,819

(22) Filed: Jun. 27, 2018

(65) Prior Publication Data
US 2019/0002008 A1   Jan. 3, 2019

(30) Foreign Application Priority Data

Jun. 30, 2017   (JP) ................. 2017-128427

(51) Int. Cl.
| B62D 1/06 | (2006.01) |
|---|---|
| B32B 27/36 | (2006.01) |
| B32B 27/06 | (2006.01) |
| B32B 15/095 | (2006.01) |
| B32B 27/40 | (2006.01) |
| B32B 15/02 | (2006.01) |

(52) U.S. Cl.
CPC ............ *B62D 1/06* (2013.01); *B62D 1/065* (2013.01); *B32B 15/02* (2013.01); *B32B 15/095* (2013.01); *B32B 27/06* (2013.01); *B32B 27/365* (2013.01); *B32B 27/40* (2013.01); *B32B 2305/38* (2013.01); *B32B 2355/02* (2013.01); *B32B 2369/00* (2013.01); *B32B 2605/003* (2013.01); *B32B 2605/08* (2013.01)

(58) Field of Classification Search
CPC .......... B62D 1/065; B62D 1/06; B62D 1/046; B62D 1/04
See application file for complete search history.

(56) References Cited

U.S. PATENT DOCUMENTS

| 8,278,602 B2* | 10/2012 | Yoneyama | B62D 1/065 219/204 |
|---|---|---|---|
| 2007/0228028 A1* | 10/2007 | Starck | H05B 3/34 219/204 |
| 2018/0244298 A1* | 8/2018 | Matrat | B62D 1/06 |
| 2018/0325224 A1* | 11/2018 | Zhang | A44B 19/34 |

FOREIGN PATENT DOCUMENTS

| JP | 2013-139203 A | 7/2013 |
| JP | 2015-189294 A | 11/2015 |

* cited by examiner

*Primary Examiner* — Daniel D Yabut
(74) *Attorney, Agent, or Firm* — Procopio, Cory, Hargreaves & Savitch LLP

(57) ABSTRACT

A steering wheel includes a core metal, a resin layer molded so as to cover a part of the core metal, a wiring including a base part covered with the resin layer so as to be integral with the part of the core metal and an extending part configured to be continuous to the base part and extend from the resin layer, a covering member deformably covering at least a part of the wiring, and an accommodating part provided in the core metal and configured to accommodate the part of the wiring together with the covering member.

3 Claims, 6 Drawing Sheets

STEERING WHEEL

CROSS REFERENCE TO RELATED APPLICATION

The present application is based on, and claims priority from Japanese Patent Application No. 2017-128427, filed Jun. 30, 2017, the disclosure of which is hereby incorporated by reference herein in its entirety.

TECHNICAL FIELD

The present application relates to a steering wheel which can be used in a vehicle, such as an electric vehicle.

BACKGROUND ART

In recent years, as one of efforts to preserve the global environment and suppress the generation of greenhouse gas emissions, electric vehicles with less environmental impact have been spreading instead of gasoline engine vehicles.

In a case of an electric vehicle, its power source is configured by a combination of storage batteries and an electric motor and basically, the electric vehicle must be supplemented with electric power from an external battery charger. For this reason, there are required measures for suppressing the consumption of stored power in the electric vehicles. Among the measures, it is the most effective means to suppress the power consumption for heating (i.e. air conditioner) whose power consumption is large.

Therefore, it has been proceeded to adopt means for directly transferring warmth to an occupant (driver) through a steering wheel that is directly touched by the occupant (driver). As one of such means, there is known a configuration where a heater wire as a heating element is embedded in a steering wheel.

Specifically, there is known a configuration that suppresses the use of a heater apparatus while reducing the operational difficulty or discomfort caused by the coldness of the steering wheel when starting and driving an electric vehicle that has been parked, for example, outdoors in winter, by assembling a heater unit into a steering wheel and additionally heating the steering wheel even when various institutions are not sufficiently warmed in a vehicle that has just started.

As a conventional steering wheel provided with such a configuration, there is known, for example, a method of forming a steering wheel rim having a heater wire embedded therein, the method includes: preparing a core metal including a rim core part and a cylindrical spacer for covering the rim core part; hooking a heater wire around the spacer in a zigzag manner or the like; setting the spacer in a cavity of a molding die while being held in the cavity through the heater wire; and injecting a synthetic resin material, such as urethane, into the molding die, thereby triggering a reaction of the synthetic resin material in the cavity of the molding die to form a resin layer covering the heater wire (see JP 2013-139203 A).

As another conventional steering wheel, there is also known a steering wheel in which a heater wire supported on a sheet-like base material is wound around a rim core part directly and further covered with a resin layer (see JP 2015-189294 A).

SUMMARY

In common with these conventional steering wheels, a part of the heater wire is extended, at the position of a spoke of the steering wheel, from the resin layer toward a central part of the steering wheel. Then, the so-extended heater wire is electrically connected to a component on a vehicle body. Due to such an arrangement of the heater wire, it must be arranged so as to pass through the end face of the resin layer outwardly. Therefore, at the stage of molding the resin layer, a part of the heater wire has to be arranged so as to extend outside the cavity of the molding die. In such a situation, it has been required to prevent the heater wire from being bitten and disconnected by the molding die at its pinch-off position when molding the resin layer.

It is therefore an object of the present application to provide a steering wheel which can suppress the disconnection of a heater wire (wiring) and which can be manufactured stably.

In order to attain the above object, a steering wheel according to an aspect of the present application includes a core metal, a resin layer molded so as to cover a part of the core metal, a wiring including a base part covered with the resin layer so as to be integral with the part of the core metal and an extending part configured to be continuous to the base part and extend from the resin layer, a covering member deformably covering at least a part of the wiring, and an accommodating part provided in the core metal and configured to accommodate the part of the wiring together with the covering member.

With the steering wheel according to the aspect of the present application, by deformably covering at least a part of the wiring, which includes the base part covered with the resin layer integrally with the core metal and the extending part continuous to the base part and extending from the resin layer, by the covering member and by accommodating the part of the wiring together with covering member in the accommodating part formed in the core metal, it is possible to reduce the possibility of a molding die biting the wiring at the time of mold matching, thereby preventing the disconnection of the wiring. Furthermore, as the space part between the wiring and the accommodating part is filled with the covering member, a synthetic resin material when molding the resin layer hardly leaks out from the accommodating part to the outside of the molding die, whereby the steering wheel body can be manufactured in a stable state.

The accommodating part may be partitioned by a pair of ribs protruding from the core metal.

With the arrangement where the accommodating part is partitioned by the pair of ribs protruding from the core metal, the accommodating part can be easily provided by forming these ribs at the stage of forming and shaping the core metal, and there is no possibility that the strength of the core metal is reduced by the presence of the accommodating part.

The accommodating part may be recessed in the core metal.

With the arrangement where the accommodating part is recessed in the core metal, the accommodating part can be easily provided by forming the accommodating part at the stage of forming and shaping the core metal, and the weight of the core metal can be reduced by the presence of the recessed accommodating part.

DESCRIPTION OF EMBODIMENTS

A configuration of a steering wheel according to a first embodiment will be described with reference to FIGS. 1 to 6.

Figure 6:
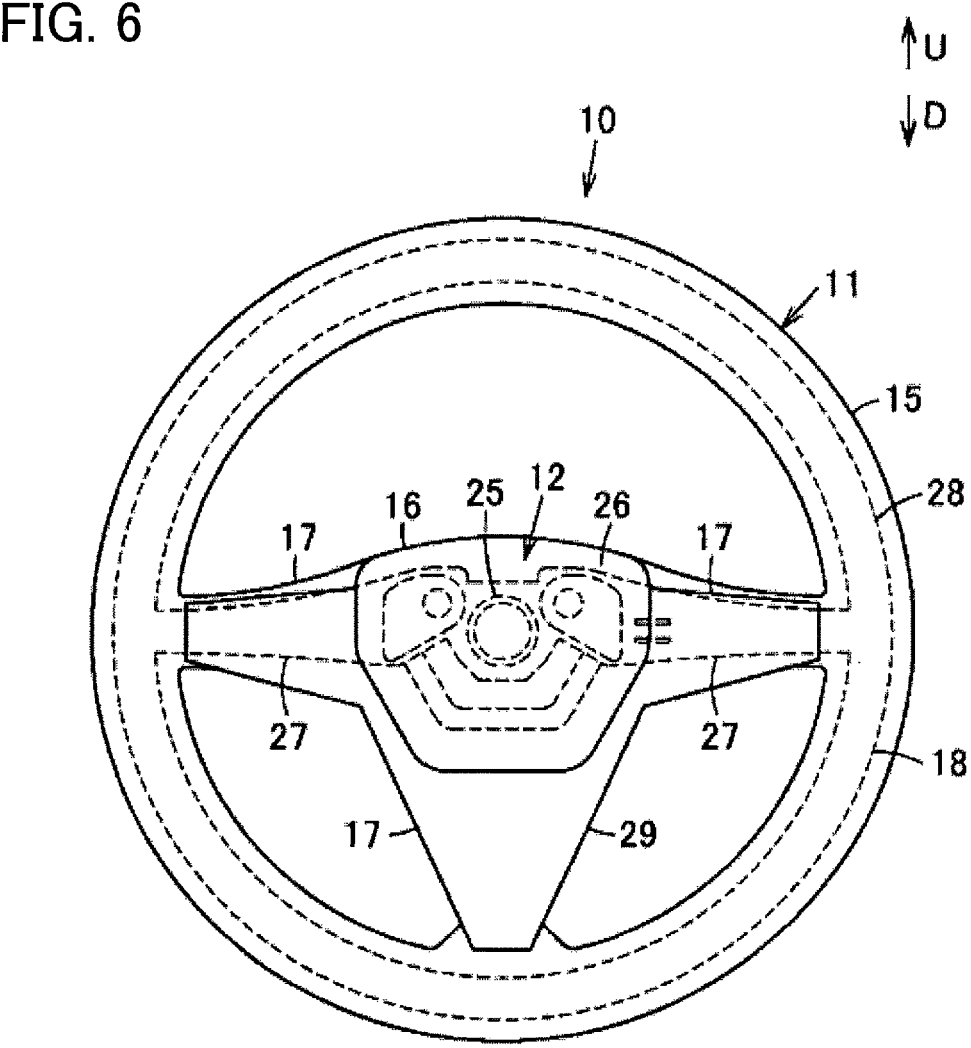
FIG. 6 is a front view illustrating the steering wheel according to the first embodiment.

As illustrated in FIG. 6, the steering wheel 10 according to the first embodiment is provided for a vehicle such as an electric vehicle and includes a steering wheel body 11 and an airbag module 12 which constitutes a center pad as a pad body fitted on an occupant side of the steering wheel body 11. Although the steering wheel 10 is fitted to a steering shaft of the vehicle in an inclined state to a vehicular vertical axis (not illustrated), the steering wheel 10 will be described while referring: an occupant side (i.e. front side) provided with the airbag module 12 to as an upper side (a direction of an arrow U); a steering-wheel side (i.e. rear side) fitted to the steering shaft to as a lower side (a direction of an arrow D); a vehicular front side (i.e. upper front side) closer to a front glass to as a front side; and also referring a vehicular rear side (i.e. lower rear side) to as a rear side.

The steering wheel body 11 includes: a rim 15 as a gripping part having an arcuate (toroidal) shape, at least a portion of the shape being configured along a circumference of the steering wheel; a boss part 16 located inside the rim 15; and a plurality of spokes 17 (three spokes in the first embodiment) connecting the rim 15 with the boss part 16. The steering wheel body 11 includes a core metal 18 made of metal. The steering wheel body 11 may be equipped with a spacer 19. The steering wheel body 11 includes an electronic component 20, a covering member 21, an accommodating part 22, a resin layer 23, and a cover body (not illustrated) as a covering member. The steering wheel body 11 may include a skin part (not illustrated) for covering the resin layer 23.

The core metal 18 is made of, for example, magnesium-aluminum (Mg—Al) alloy, iron, or the like. The boss part 16 is provided, on its lower portion on the side of a vehicle body, with a substantially cylindrical steering boss 25 having a serration structure meshing with the steering shaft. A boss plate 26 constituting a core body is integrally fixed to the steering boss 25. Corresponding to the spokes 17, spoke core parts 27 are fixed to the boss plate 26 by mean of integral-molding (extending) or welding. As a gripping core corresponding to the rim 15, a rim core part 28 is fixed to the spoke core parts 27 by welding or the like.

The spoke core parts 27 are radially arranged so as to extend from the boss plate 26 toward the rim core part 28. The spoke core parts 27 need not necessarily correspond to all the spokes 17. That is, the spokes 17 may be partially configured by a finisher 29 (see FIG. 6) or the like instead of the spoke core parts 27. The finisher 29 is not an essential element for the steering wheel 10.

The rim core part 28 is formed into a circular arc (toroidal) shape.

The spacer 19, which is also called to as "shell" or the like, arranges the electronic component 20 around the rim core part 28 and holds the electronic component 20 so as to keep a distance from the surface of the rim 15 constant. The spacer 19 is interposed between the rim core part 28 and the electronic component 20. The spacer 19 is made of, for example, polycarbonate or synthetic resin such as acrylonitrile butadiene styrene (ABS). The spacer 19 is formed into a circular arc (toroidal) shape so as to cover the entire periphery of the rim core part 28. Further, the spacer 19 is formed into a cylindrical shape. Therefore, the spacer 19 is provided in a hollow annular shape. The spacer 19 is provided with communication holes 31. For example, the spacer 19 is divided into a plurality of members, so that they are assembled around the rim core part 28. That is, under a condition that the spacer 19 is assembled around the rim core part 28, it is positioned inside the spacer 19 (see FIG. 3). The spacer 19 is arranged so as to cover the rim core part 28 at a position away from the rim core part 28. In other words, there is defined a spatial part between the spacer 19 and the rim core part 28.

The communication holes 31 are provided to allow liquid synthetic resin material, which is used when molding the resin layer 23, to flow into the spacer 19. This liquid synthetic resin material constitutes a reaction mixture which that reacts to form polyurethane in molding the resin layer 23. The communication holes 31 are arranged so as to penetrate the outer circumferential surface of the spacer 19. The communication holes 31 may be arranged in the circumferential direction of the spacer 19.

The electronic component 20 is provided to adjust the temperature of the rim 15, for example. Specifically, the electronic component 20, which is a temperature-controlling component, includes a sheet member 33 (as an electronic component body) provided with, for example, a heating wire that generates heat when energized, and a wiring 34 electrically connected to the heating wire of the sheet member 33. Alternatively, the electronic component 20 may include, for example, a heater wire that generates heat by electric conduction, a sensor member for detecting the temperature of the rim 15, a sensor for detecting an occupant's gripping of the rim 15 (e.g. a pressure sensor, an electrostatic capacity sensor or the like).

For example, the sheet member 33 is formed by a sheet made of a porous material. For example, the sheet member 33 may be formed by a nonwoven fabric or a mesh. Alternatively, it may be provided by forming a heating wire in a mesh shape. A large number of holes 33a are provided in the sheet member 33. The sheet member 33 is disposed at the position of the rim core part 28. In the first embodiment, the sheet member 33 is wound around the outer portion (i.e. outer circumferential surface) of the spacer 19 and also arranged so as to cover the entire spacer 19.

The wiring 34 is led out from the sheet member 33. The wiring 34 includes, for example, a pair of wires. The wiring 34 is led out from the rim core part 28 (about which the sheet member 33 exists) along the spoke core part 27. In the wiring 34, its portion on the side of the sheet member 33 is embedded in the resin layer 23, while a leading end portion of the wiring 34 is led out from the resin layer 23. That is, the wiring 34 is arranged so as to extend from the inside of the resin layer 23 up to the outside. In other words, the wiring 34 includes a base part 34a which is embedded in the resin layer 23 integrally with a portion of the core metal 18 (a portion of the spoke core part 27 and the rim core part 28) and an extending part 34b which is continuous to the base part 34a and extends toward the outside of the resin layer 23. A connector 35 is connected to the extending part 34b of the wiring 34. The connector 35 is connected to a controller (not illustrated). That is, the electronic component 20 is electrically connected to the controller via the wiring 34. The electronic component 20 generates heat since the heating wire of the sheet member 33 is energized by the controller. The wiring 34 is covered with a sheath 36 (see FIG. 1B) as an insulator. The wiring 34 is partially covered with the covering member 21 and also retained in the covering member 21.

The sheath 36 is formed by insulating films. The sheath 36 is deformable with predetermined thickness and flexibility. In operation, the sheath 36 covers the wiring 34 so as not to expose respective strands of the wiring 34, thereby preventing a short circuit between the wiring 34 and the core metal 18.

For example, the covering member 21 is made from the same synthetic resin material as the resin layer 23. The covering member 21 is formed by so-called urethane foam which can be obtained by finely foaming, for example, soft polyurethane resin. The covering member 21 is formed to be deformable freely, and encloses the wiring 34 altogether. The covering member 21 covers and holds the wiring 34 of predetermined length containing a continuous part of the base part 34a and the extending part 34b. Therefore, the covering member 21 is arranged so as to strand over the interior side of the resin layer 23 and the exterior side of the resin layer 23. For instance, the covering member 21 is shaped so as to have a rectangular cross-section. The covering member 21 is accommodated in the accommodating part 22 and also fixed to the accommodating part 22 by a fixing member 37. In the covering member 21, its one-end portion in the longitudinal direction (a portion covering the extending part 34b of the wiring 34) extends from the accommodating part 22 toward a center side of the core metal 18 on the side of the airbag module 12. That is, the covering member 21 includes one part accommodated in the accommodating part 22 and the remaining part protruding from the accommodating part 22. Although the covering member 21 is formed so as to continuously cover the wiring 34, it may be formed so as to intermittently cover several portions of the wiring 34. Further, although the covering member 21 is constituted of a different component from the sheath 36, the covering member 21 and the sheath 36 may be formed into one component. That is, the sheath 36 could be also utilized as the covering member.

For example, a fixing tape is used for the fixing member 37. The fixing member 37, which is formed in e.g. a belt-like shape, is arranged along a direction crossing (orthogonal) to the covering member 21 (i.e. the wiring 34), thereby fixing the covering member 21 to the accommodating part 22 (i.e. the spoke core part 27 and the core metal 18).

In the accommodating part 22, there are accommodated the covering member 21 and a part of the wiring 34, for example, at least a continuous wiring part of the base part 34a and the extending part 34b. In the first embodiment, the covering member 21 and the wiring 34 of predetermined length containing the continuous part of the base part 34a and the extending part 34b are accommodated in the accommodating part 22. The accommodating part 22 is provided on the core metal 18 and one spoke core part 27 (for example, the spoke core part 27 positioned in the direction of 3 o'clock). For example, the accommodating part 22 is provided narrow and long along the longitudinal direction of the spoke core part 27. The accommodating part 22 is defined between a pair of ribs 22a. That is, the accommodating part 22 is formed to be almost flush with the core metal 18 (i.e. the spoke core part 27), and both sides of the accommodating part 22 are partitioned by the pair of ribs 22a respectively. The covering member 21 is fitted and accommodated in the accommodating part 22. In other words, the accommodating part 22 is formed with a width dimension substantially equal to that of the covering member 21. Therefore, the covering member 21 is disposed in the accommodating part 22 with no gap.

The pair of ribs 22a is protruded from the core metal 18. The pair of ribs 22a is protruded from the upper side (occupant side) surface of the spoke core part 27. The pair of ribs 22a is arranged to be separated from each other in substantially parallel. The pair of ribs 22a is raised upward from the upper side surface of the spoke core part 27, for example, with a dimension substantially equal to or larger than the diameter of the wiring 34. The pair of ribs 22a are raised upward from the upper side surface of the spoke core part 27 with a projecting dimension substantially equal to the thickness of the covering member 21. The pair of ribs 22a is formed at the same time of molding the core metal 18. The pair of ribs 22a is formed such that their leading ends become substantially flush with the covering member 21 accommodated in the accommodating part 22.

Figure 4A:
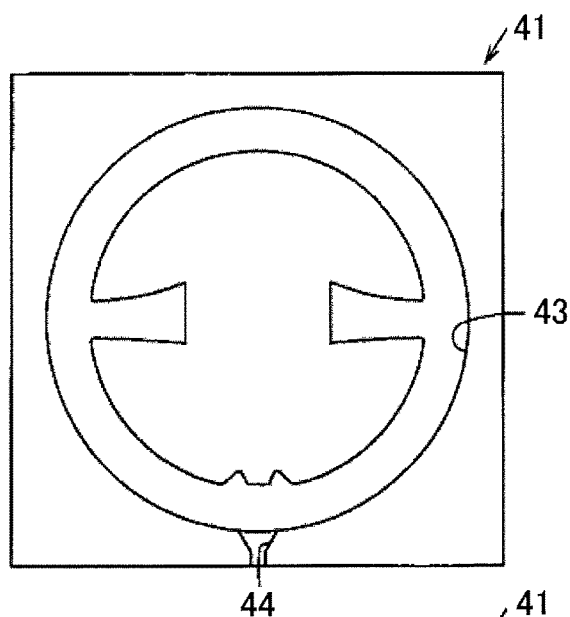
FIG. 4A is a front view schematically illustrating a state where a molding die for the steering wheel according to the first embodiment is opened.
Figure 4B:
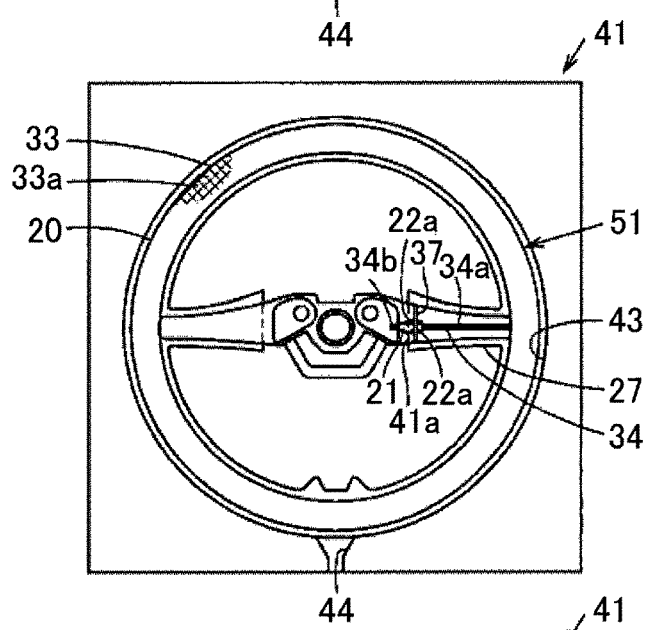
FIG. 4B is a front view schematically illustrating a setting process of a manufacturing method of the steering wheel according to the first embodiment.
Figure 4C:
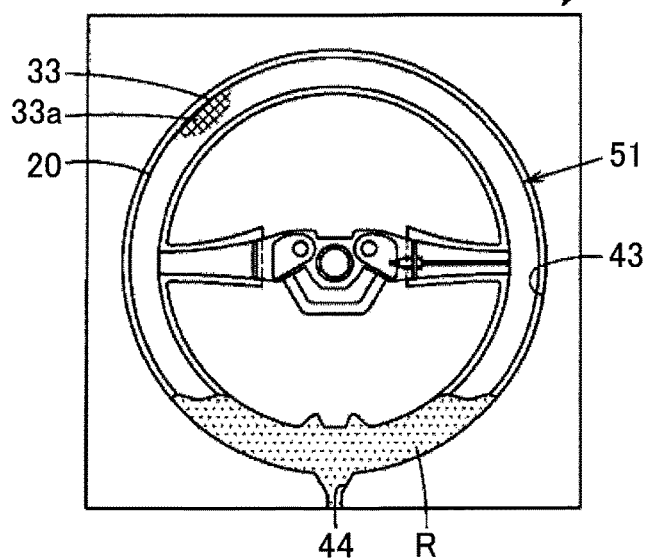
FIG. 4C is a front view schematically illustrating an injection process of the manufacturing method of the steering wheel according to the first embodiment.

The resin layer 23 is arranged so as to cover entire of the rim core part 28 and a portion of the spoke core parts 27. Thus, the resin layer 23 is formed with a substantially circular cross-section and into an arcuate (toroidal) shape when viewed from the front. More specifically, at the position of the rim 15, the resin layer 23 is integrally provided so as to cover the rim core part 28, the spacer 19, and the electronic component 20. Also, at the position of each spoke 17, the resin layer 23 is arranged so as to cover a region of the spoke core part 27 of predetermined distance. The predetermined distance is established so as to start from each end of the spoke core part 27, which terminates in its connecting point to the rim core part 28. That is, one space part between the rim core part 28 and the spacer 19 and another space part between the spacer 19, and the electronic component 20 are filled with the resin layer 23. In other words, inside the resin layer 23, there are embedded the rim core part 28, the spacer 19, the sheet member 33 of the electronic component 20 and the base part 34a of the wiring 34. In the resin layer 23, a pinch-off surface 23a is formed in a position between both ends of the spoke core part 27 of the core metal 18 to form one end of the resin layer 23 which constitutes a boundary surface with the airbag module 12. The pinch-off surface 23a is disposed in a position to engage with the accommodating part 22 (i.e. the pair of ribs 22a). That is, as illustrated in FIG. 1, the extending part 34b of the wiring 34 together with a part of the covering member 21 extend from the resin layer 23 at the position of the pinch-off surface 23a. The pinch-off surface 23a is formed so as to extend in a direction intersecting with the longitudinal direction of the accommodating part 22 (i.e. the pair of ribs 22a), namely, the longitudinal direction of the spoke core part 27. In the first embodiment, the pinch-off surface 23a is formed along the vertical direction of the vehicle. Here, the resin layer 23 is fabricated by fine-foaming a resin material such as flexible polyurethane resin. Additionally, the resin layer 23 is molded using a molding die 41 as illustrated in FIGS. 4A to 4C and the like.

In general, the molding die 41 includes one half mold and another half mold between which there are dined a cavity 43, a gate 44, and the like. The molding die 41 is used on condition of disposing the gate 44 in the lower part of the die 41 (i.e. in the direction of 6 o'clock in a view from the front). With this layout, the resin layer 23 is molded in a posture substantially similar to the steering wheel 10 in the use state.

The cavity 43 is a first space having a circular cross-section and a toroidal shape in a front view, corresponding to the profile of the rim 15 (or the resin layer 23). The cavity 43 is filled with a synthetic resin material R injected from the gate 44.

The gate 44 is a die portion through which the synthetic resin material R is injected into the cavity 43. The gate 44 is also called to as, for example, "fan gate" and also formed so as to communicate with the cavity 43 and gradually expand toward the cavity 43. A mixer unit (not illustrated) is connected to the gate 44 to mix and agitate the synthetic resin material R to be discharged.

A cover body (not illustrated), which may be called to as back cover, bottom cover, or body cover, is made of synthetic resin or the like to cover the underside of the boss part 16.

The airbag module 12 includes a bag-shaped airbag, a resinous cover body for covering the airbag in a folded state, and an inflator for injecting gas. The airbag module 12 is configured so as to absorb an impact on an occupant (e.g. a driver) at the time of a vehicle collision or the like. Specifically, at a vehicle collision, the inflator rapidly injects gas into the interior of the airbag, thereby allowing the folded and accommodated airbag to be expanded rapidly. With the airbag expanded, the cover body is cleaved, and the airbag is inflated and expanded on the front side of the occupant, thereby absorbing an impact on the occupant. In a modification, a horn switch mechanism or the like (as a switching equipment) may be integrally incorporated in the air bag module 12.

The manufacturing method of the steering wheel will be described below.

Figure 1A:
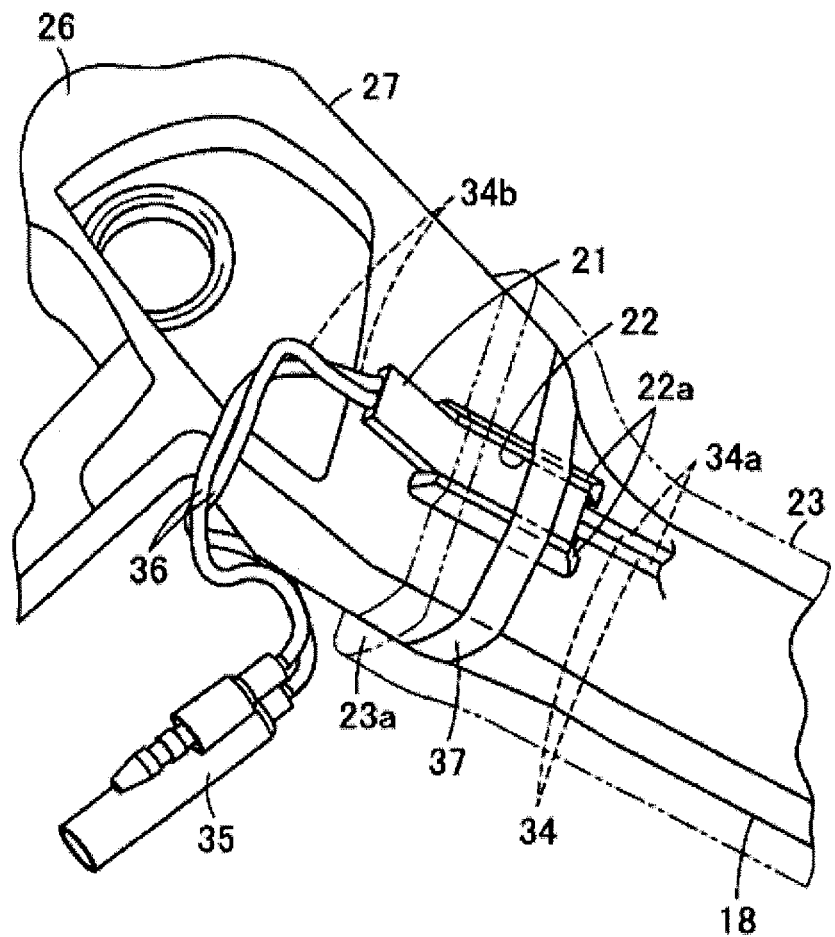
FIG. 1A is a perspective view illustrating a vicinity of an accommodating part of a steering wheel according to a first embodiment.
Figure 1B:
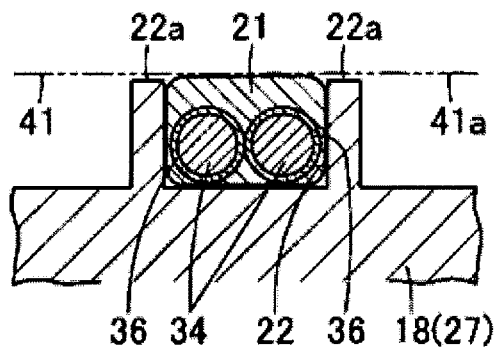
FIG. 1B is a cross-sectional view illustrating the vicinity of the accommodating part of the steering wheel according to the first embodiment.
Figure 2A:
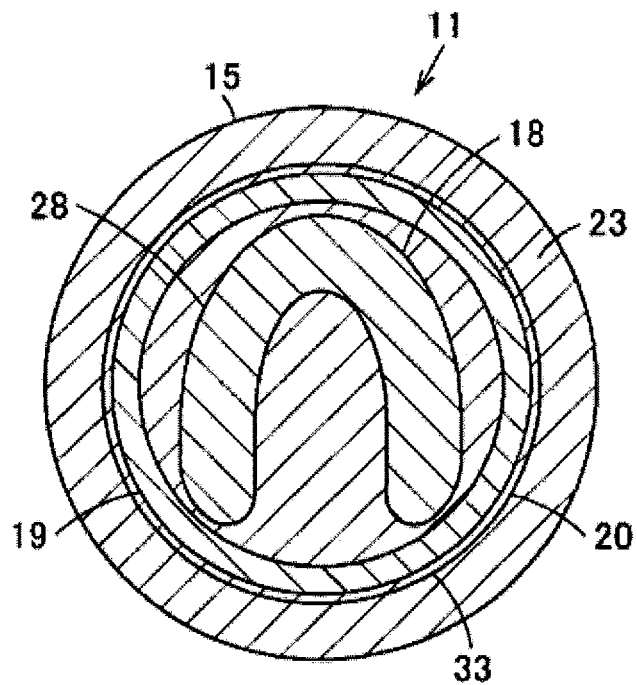
FIG. 2A is a cross-sectional view of a gripping part of the steering wheel according to the first embodiment.
Figure 2B:
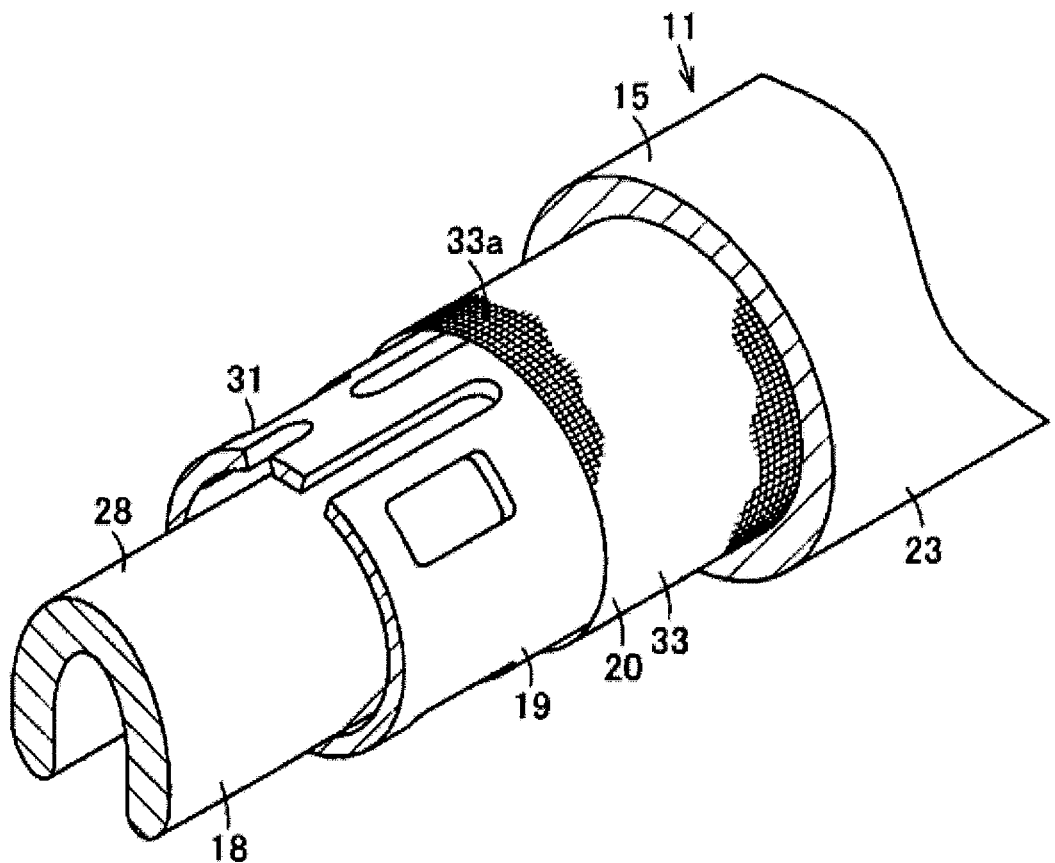
FIG. 2B is a perspective cross-sectional view of the gripping part of the steering wheel according to the first embodiment.
Figure 3:
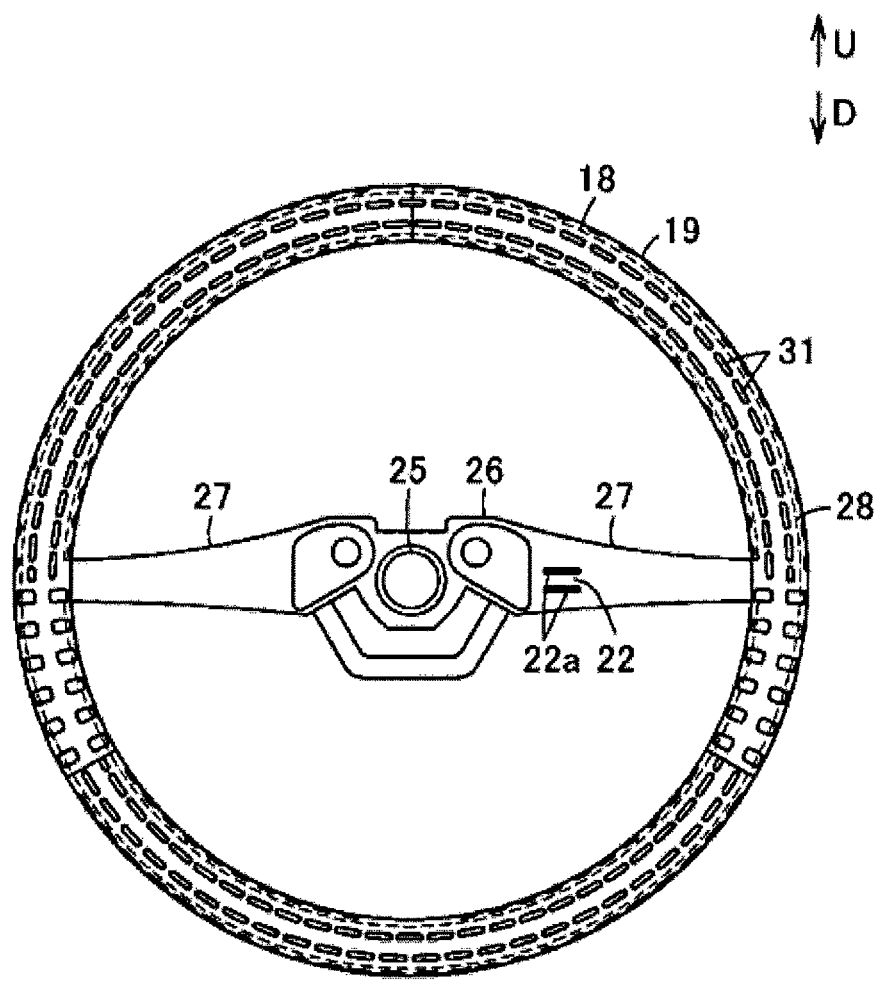
FIG. 3 is a front view illustrating a state before wrapping an electronic component around an outer surface of a first intermediate body of the steering wheel according to the first embodiment.

First, it is performed to cover the outer periphery of the rim core part 28 of the core metal 18 integrated with the boss plate 26 with the spacer 19 (see FIG. 3). Next, the electronic component 20 is wound around the outer surface of the spacer 19 to form a first intermediate body 51 as illustrated in FIG. 4B, in advance. Then, it is performed to set the first intermediate body 51 in the molding die 41 where one half mold and the other half mold are being opened. Subsequently, these half molds are closed to each other to form the cavity 43 in the molding die 41 (setting process). In this state, the rim core part 28 and respective portions of the spoke core ports 27 are located in the cavity 43. In the molding die 41, additionally, there is defined a pinch-off part 41a which serves as an alignment position of one half mold (or the other half mold) of the molding die 41. This pinch-off part 41a is arranged in a position intersecting the accommodating part 22. At this time, as illustrated in FIG. 1B, the pinch-off part 41a abuts on the pair of ribs 22a in a state where the molding die 41 is closed, so that it is prevented that the wiring 34 is stuck in between one half mold and the other half mold of the molding die 41. In other words, in the setting process, one half mold and the other half mold of the molding die 41 are mated so that the pinch-off part 41a, which serves to form the pinch-off surface 23a as the end (end face) of the resin layer 23, abuts on the core metal 18 (i.e. the spoke core part 27) on both sides (i.e. the pair of ribs 22a) of the accommodating part 22.

Next, as illustrated in FIG. 4C, the synthetic resin material R is agitated and mixed by the mixer unit and subsequently injected into the cavity 43 through the gate 44 of the molding die 41 (injection process). At this time, the synthetic resin material R is divided from the gate 44 into the left and right sides of the cavity 43 substantially evenly. Then, the so-divided synthetic resin material R enters the holes 33a of the sheet member 33 forming the electronic component 20 and further enter into the spacer 19 through the communication holes 31. During this entry, the synthetic resin material R reacts while being foamed in the molding die 41 and flows toward a flow terminal region in the molding die 41 while transforming to polyurethane. Meanwhile, at the position of the pinch-off part 41a, as the gap between the covering member 21 and the accommodating part 22 is blocked with the arrangement where the covering member 21 is fitted to the accommodating part 22, there is no possibility that the synthetic resin material R leaks out of the accommodating part 22.

Figure 5A:
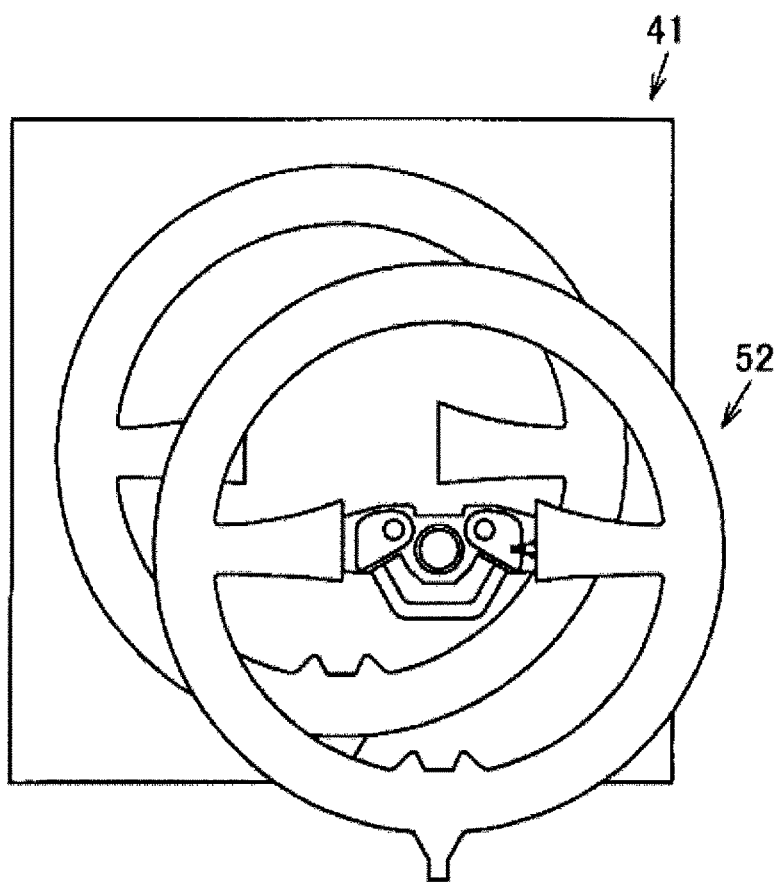
FIG. 5A is a front view schematically illustrating a demolding process of the manufacturing method of the steering wheel according to the first embodiment.
Figure 5B:
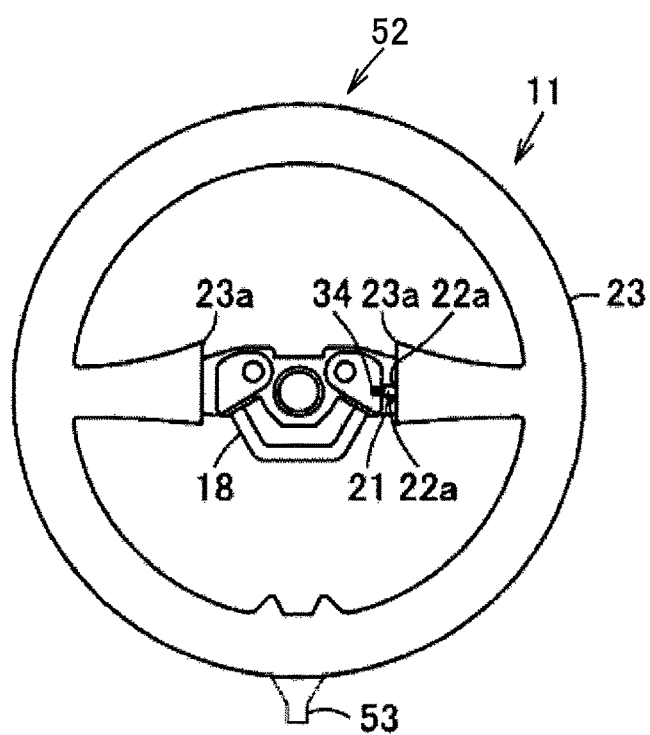
FIG. 5B is a front view schematically illustrating a finishing process of the manufacturing method of the steering wheel according to the first embodiment.

After that, the half molds are opened, and a second intermediate body 52 as illustrated in FIG. 5A, which has been produced since the resin layer 23 had integrally covered the rim core part 28, the spacer 19, and the electronic component 20 in the cavity 43, is removed from the molding die 41 (demolding process). Finally, it is performed to remove a burr 53, which has been formed at the position of the gate 44 of the molding die 41, from the second intermediate body 52 by cutting or the like, as illustrated in FIG. 5B (finishing process). In this way, the steering wheel body 11 is completed.

After completing the steering wheel body 11, the connector 35 (see FIG. 1A) at a leading end of the wiring 34 led out from the resin layer 23 is electrically connected to the controller. Thereafter, as illustrated in FIG. 6, the air bag module 12, the finisher 29, and the like are attached to the steering wheel body 11, so that the steering wheel 10 is completed. That is, according to the first embodiment, it is possible to produce the steering wheel 10 with neither winding a skin body on the surface of the rim 15 nor requiring a plurality of molding processes.

As described above, in the first embodiment, at least a part of the wiring 34, each of which includes the base part 34a integrally covered with the resin layer 23 integrally with the core metal 18 and the extending part 34b extending from the base part 34a, are deformably covered with the covering member 21 and furthermore, a part of the wiring 34 (e.g. a wiring region including a position where the base part 34a and the extending part 34b extend continuously) is accommodated in the accommodating part 22 formed in the core metal 18, together with the covering member 21.

That is, in the state where: at least a portion of the wiring 34 having the base part 34a and the extending part 34b extending from the base part 34a are deformably covered with the covering member 21; and the part of the wiring 34 together with the covering member 21 are accommodated in the accommodating part 22 formed in the core metal 18, the steering wheel body 11 is set in the molding die 41 for molding the resin layer 23. Then, in a state of matching the half molds of the molding die 41 so that the pinch-off part 41a forming the pinch-off surface 23a of the resin layer 23 abuts on the accommodating part 22 (the pair of ribs 22 a), the synthetic resin material R is supplied into the molding die 41 to form the resin layer 23.

Consequently, since the position of the molding die 41 when molding the resin layer 23 is restricted by the accommodating part 22 to reduce the possibility of the molding die 41 biting the wiring 34 at the time of mold matching, it is possible to prevent the disconnection of the wiring 34. Furthermore, as the space part between the wiring 34 and the accommodating part 22 is filled with the covering member 21, the synthetic resin material R when molding the resin layer 23 hardly leaks out from the accommodating part 22 to the outside of the molding die 41, the steering wheel body 11 can be stably manufactured.

Further, with the arrangement where the accommodating part 22 is defined by the pair of ribs 22a projecting from the core metal 18 (the spoke core part 27), it is possible to easily fabricate the accommodating part 22 by the pair of ribs 22a when shaping the core metal 18. In addition, as the core metal 18 (the spoke core part 27) is reinforced by the pair of ribs 22a, there is no possibility that the strength of the metal core 18 (the spoke core part 27) is lowered by the accommodating part 22.

Figure 7:
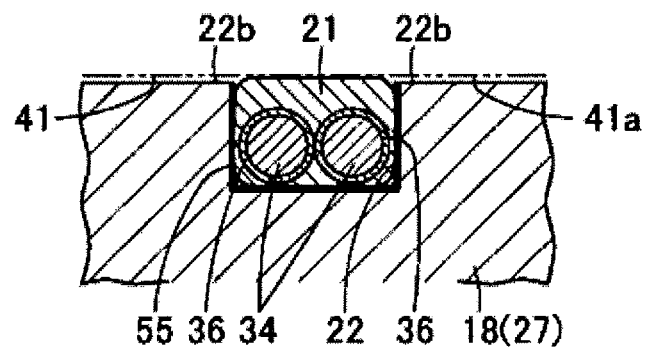
FIG. 7 is a cross-sectional view illustrating a part of a steering wheel according to a second embodiment.

Instead of the first embodiment, as in a second embodiment illustrated in FIG. 7, the accommodating part 22 may be constituted by a recess formed in the core metal 18 (spoke core portion 27). In other words, the accommodating part 22 may be provided in the form of a groove. Then, the accommodating part 22 is formed with a depth substantially equal to or larger than the diameter dimension of the wiring 34. In the second embodiment, the accommodating part 22 is recessed in the upper side surface of the spoke core part 27 with a depth substantially equal to the thickness of the covering member 21. The covering member 21 can also be fixed to the accommodating part 22 in a state where the movement of the covering member 21 is being restricted by a fixing member 55, such as an adhesive disposed in the accommodating part 22.

In this case, in the above-described setting process, since both side portions 22b of the accommodating part 22, which form the upper side surface of the core metal 18 (spoke core part 27), abut on the pinch-off part 41a when the half molds of the molding die 41 are matched to each other, in other words, since the half molds of the molding die 41 are matched to each other so that the pinch-off part 41a for forming the pinch-off surface 23a as the end part of the resin layer 23 abuts on the core metal 18 (the spoke core part 27) at both side portions 22b of the accommodating part 22, it is possible to prevent the wiring 34 from being bitten between the one half mold and the other half mold, thereby exhibiting an effect similar to the first embodiment.

Additionally, with the arrangement where the accommodating part 22 is recessed in the core metal 18, the accommodating part 22 can be easily formed at the same time of forming and shaping the core metal 18. Additionally, as the accommodating part 22 serves as a cut-off portion, it is possible to reduce the weight of the core metal 18.

Still further, by the fixing member 37 of the first embodiment, the covering member 21 may be fixed to the accommodating part 22, which is recessed in the core metal 18 as in the second embodiment, together with the wiring 34. Alternatively, by the fixing member 55 of the second embodiment, the covering member 21 may be fixed to the accommodating part 22, which is defined between the pair of ribs 22a as in the first embodiment, together with the wiring 34.

In each of the above-mentioned embodiments, the spacer 19 is not indispensable. Instead of it, for example, there may be adopted an arrangement where the electronic component 20 (the sheet member 33) is directly wound around the core metal 18 (the rim core part 28).

The steering wheel 10 is not limited to the configuration having three spokes 17, and it may be configured with two, four or more spokes 17.

Further, the steering wheel 10 can be used not only as a steering wheel for a vehicle, such as an electric vehicle, but also as a steering wheel for an arbitrary vehicle.

Sill further, the airbag module 12 may be replaced with, for example, a pad body containing a shock absorber.

What is claimed is:

1. A steering wheel, comprising:
a core metal;
a resin layer molded so as to cover an entire circumference of the core metal in a defined cross section;
a wiring including a base part covered with the resin layer so as to be integral with the part of the core metal and an extending part configured to be continuous to the base part and extend from the resin layer;
a connector connected to an end-portion of the extending part of the wiring;
a covering member deformably covering a predetermined length of the wiring containing a continuous part of the base part and the extending part; and
an accommodating part provided in the core metal and configured to accommodate the part of the wiring together with the covering member, wherein
a part of the covering member covering the base part is covered with the resin layer, and
a part of the covering member covering the extending part is outside of and extends from the resin layer.

2. The steering wheel of claim 1, wherein the accommodating part is partitioned by a pair of ribs protruding from the core metal.

3. The steering wheel of claim 1, wherein the accommodating part is recessed in the core metal.

* * * * *